(12) United States Patent
Achtermann et al.

(10) Patent No.: US 7,191,208 B1
(45) Date of Patent: Mar. 13, 2007

(54) METHODS OF SELECTIVELY DISTRIBUTING DATA IN A COMPUTER NETWORK AND SYSTEMS USING THE SAME

(75) Inventors: Jeffrey Mark Achtermann, Austin, TX (US); Troy Allen Cranford, Austin, TX (US); Alberto Giammaria, Austin, TX (US); Shinta Dewi Arifin Tjio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 09/460,852

(22) Filed: Dec. 14, 1999

(51) Int. Cl.
*G06F 15/16* (2006.01)

(52) U.S. Cl. .................. 709/203; 709/245; 717/171; 717/176

(58) Field of Classification Search .............. 709/106, 709/202, 203, 245; 707/2, 7, 10; 717/168, 717/172, 173, 174, 177, 178, 171, 176
See application file for complete search history.

(56) References Cited

U.S. PATENT DOCUMENTS

| | | | |
|---|---|---|---|
| 4,523,206 A | 6/1985 | Sasscer | 364/200 |
| 4,697,266 A | 9/1987 | Finley | 371/12 |
| 5,132,902 A * | 7/1992 | Williams | |
| 5,230,048 A * | 7/1993 | Moy | |
| 5,247,661 A * | 9/1993 | Hager et al. | |
| 5,367,643 A | 11/1994 | Chang et al. | 395/325 |
| 5,446,874 A | 8/1995 | Waclawsky et al. | 395/575 |
| 5,448,230 A | 9/1995 | Schanker et al. | 340/870.03 |
| 5,455,934 A | 10/1995 | Holland et al. | 395/404 |
| 5,457,683 A | 10/1995 | Robins | 370/60 |
| 5,566,306 A | 10/1996 | Ishida | 395/309 |
| 5,572,678 A | 11/1996 | Homma et al. | 395/200.12 |
| 5,586,256 A | 12/1996 | Thiel et al. | 395/200.03 |
| 5,590,124 A | 12/1996 | Robins | 370/258 |
| 5,680,602 A | 10/1997 | Bloem et al. | 395/601 |
| 5,689,642 A * | 11/1997 | Harkins et al. | |
| 5,701,482 A | 12/1997 | Harrison et al. | 395/675 |
| 5,724,516 A | 3/1998 | Temoshenko | 395/200.32 |

(Continued)

FOREIGN PATENT DOCUMENTS

EP    0 192 120    8/1986

(Continued)

OTHER PUBLICATIONS

"Error Handler Activation Procedure," *IBM Technical Disclosure Bulletin*, vol. 37 No. 8, Aug. 1994, pp. 231-232.

(Continued)

*Primary Examiner*—Andrew Caldwell
*Assistant Examiner*—Stephan Willett
(74) *Attorney, Agent, or Firm*—Duke W. Yee; Jeffrey S. LaBaw; Betty Formby

(57) ABSTRACT

A method of distributing data in a network including a server and an end-user computer. The end-user computer queries the server for a distribution list and then receives that list from the server. The end-user computer then determines if the distribution list is non-empty, and if it is non-empty, selects a distribution from the distribution list using a selected one of manual and automatic modes. The selected distribution is then downloaded from the server to the end-user computer.

21 Claims, 8 Drawing Sheets

U.S. PATENT DOCUMENTS

| | | | |
|---|---|---|---|
| 5,745,783 A | 4/1998 | Suzuki et al. | 395/825 |
| 5,754,763 A | 5/1998 | Bereiter | 395/187.01 |
| 5,761,499 A * | 6/1998 | Sonderegger | 707/10 |
| 5,799,323 A | 8/1998 | Mosher, Jr. et al. | 707/202 |
| 5,805,920 A | 9/1998 | Sprenkle et al. | 395/821 |
| 5,819,083 A | 10/1998 | Chen et al. | 395/610 |
| 5,842,212 A | 11/1998 | Ballurio et al. | 707/100 |
| 5,933,647 A * | 8/1999 | Aronberg et al. | |
| 5,960,189 A * | 9/1999 | Stupek, Jr. et al. | |
| 5,999,947 A * | 12/1999 | Zollinger et al. | |
| 6,023,586 A * | 2/2000 | Gaisford et al. | 707/10 |
| 6,029,172 A * | 2/2000 | Jorna et al. | |
| 6,029,175 A * | 2/2000 | Chow et al. | |
| 6,049,671 A * | 4/2000 | Slivka et al. | |
| 6,112,181 A * | 8/2000 | Shear et al. | |
| 6,115,549 A * | 9/2000 | Janis et al. | |
| 6,192,518 B1 * | 2/2001 | Neal | |
| 6,208,935 B1 * | 3/2001 | Yamada et al. | |
| 6,275,846 B1 * | 8/2001 | Kondo et al. | |
| 6,282,709 B1 * | 8/2001 | Reha et al. | |
| 6,282,711 B1 * | 8/2001 | Halpern et al. | 709/203 |
| 6,314,565 B1 * | 11/2001 | Kenner et al. | |
| 6,345,288 B1 * | 2/2002 | Reed et al. | 709/203 |
| 6,360,366 B1 * | 3/2002 | Heath et al. | 709/203 |
| 6,381,630 B1 * | 4/2002 | Niemi | |
| 6,542,943 B2 * | 4/2003 | Cheng et al. | 710/36 |
| 6,557,054 B2 * | 4/2003 | Reisman | 710/33 |
| 6,591,418 B2 * | 7/2003 | Bryan et al. | 717/177 |

FOREIGN PATENT DOCUMENTS

| | | |
|---|---|---|
| EP | 0 711 088 | 5/1996 |
| EP | 0 871 123 | 10/1998 |
| IE | 66464 | 4/1994 |
| JP | 7-50673 | 2/1995 |
| JP | 9-331323 | 12/1997 |
| JP | 10-303890 | 11/1998 |
| SU | 1741145 A2 | 6/1992 |
| WO | WO 97/15018 | 4/1997 |
| WO | WO97/38624 | 10/1997 |

OTHER PUBLICATIONS

"Transferring Bulk Data in Message Queueing System," *IBM Technical Disclosure Bulletin*, vol. 41 No. 1, Jan. 1998, pp. 437-438.
"Execution Time Dynamic Data Collection at First Detection of Failure," *IBM Technical Disclosure Bulletin*, vol. 37 No. 6B, Jun. 1994, pp. 391-392.
"'Variable Paged Array' Datatype," *IBM Technical Disclosure Bulletin*, vol. 37 No. 7, Jul. 1994, pp. 89-92.
"Distributing a Document Using a Regional Reference," *IBM Technical Disclosure Bulletin*, vol. 33 No. 3A, Aug. 1990, p. 251.
"Using Data Link Control-Level Feedback to Control Application Buffer Usage and Packet Loss," *IBM Technical Disclosure Bulletin*, vol. 41 No. 1, Jan. 1998, pp. 199-204.
"Dynamic Determination of Network Topology," *IBM Technical Disclosure Bulletin*, vol. 38 No. 3, Mar. 1995, pp. 411-418.
"Pointer Collection and Reporting for Error Recovery Procedures Branching," *IBM Technical Disclosure Bulletin*, vol. 39 No. 7, Jul. 1996, pp. 87-90.
"Hybrid Switch Control Scheme for Fast Point-to-Point/Multicast/Hunt-Group Connection Setup," *IBM Technical Disclosure Bulletin*, vol. 37 No. 11, Nov. 1994, pp. 641-646.
"Flow Control of Prioritized Data in a Multimedia Communications System," *IBM Technical Disclosure Bulletin*, vol. 37 No. 1, Jan. 1994, pp. 531-532.
"Distributed Object Encapsulation of Customer Information Control System Distributed Transaction Processing," *IBM Technical Disclosure Bulletin*, vol. 38 No. 1, Jan. 1995, pp. 177-180.
"Reconciliation of Shadowed Mail Items with Master," *IBM Technical Disclosure Bulletin*, vol. 33 No. 6B, Nov. 1990, pp. 120-121.
"Riadata—An Automated Retain Incident Analysis Facility," *IBM Technical Disclosure Bulletin*, vol. 34 No. 10A, Mar. 1992, pp. 278-283.
Cao G. et al., "Low-cost Checkpointing with Mutable Checkpoints in Mobile Computing Systems," International Conference on Distributed Computing Systems, 18th, Amsterdam, May 26-29, 1998, Proceedings, pp. 464-471.
Wiener, J.L. et al., "OODB Bulk Loading Revisited: the Partitioned-list Approach," International Conference on Very Large Data Bases, 21st, Zurich, Sep. 11-15, 1995, Proceedings of VLDB '95, pp. 30-41.
Muntz, D.A. et al., "Evaluating Delayed Write in a Multilevel Caching File System," IFIP/IEEE International Conference on Distributed Platforms, [Dresden, Feb. 27-Mar. 1, 1996] Proceedings: Client/Server and Beyond, pp. 415-429.
Jakoby, A. et al., "Data Transmission in Processor Networks," International Workshop on Distributed Algorithms, 9th, Proceedings of WDAG '95, pp. 145-159.
Joshi, A. et al., "On Disconnected Browsing of Distributed Information," International Workshop on Research Issues in Data Engineering, 7th, Birmingham, UK, Apr. 7-8, 1997, Proceedings: High Performance Database Management for Large-scale Applications, pp. 101-107.
Saglietti, F., "Dynamic Decision on Checkpointing by Use of Reduced Ordered Binary Decision Diagrams," International Conference on Computer Safety, Reliability and Security, 16th, York, UK, Sep. 7-10, 1997, [Proceedings of] SAFECOMP '97.

* cited by examiner

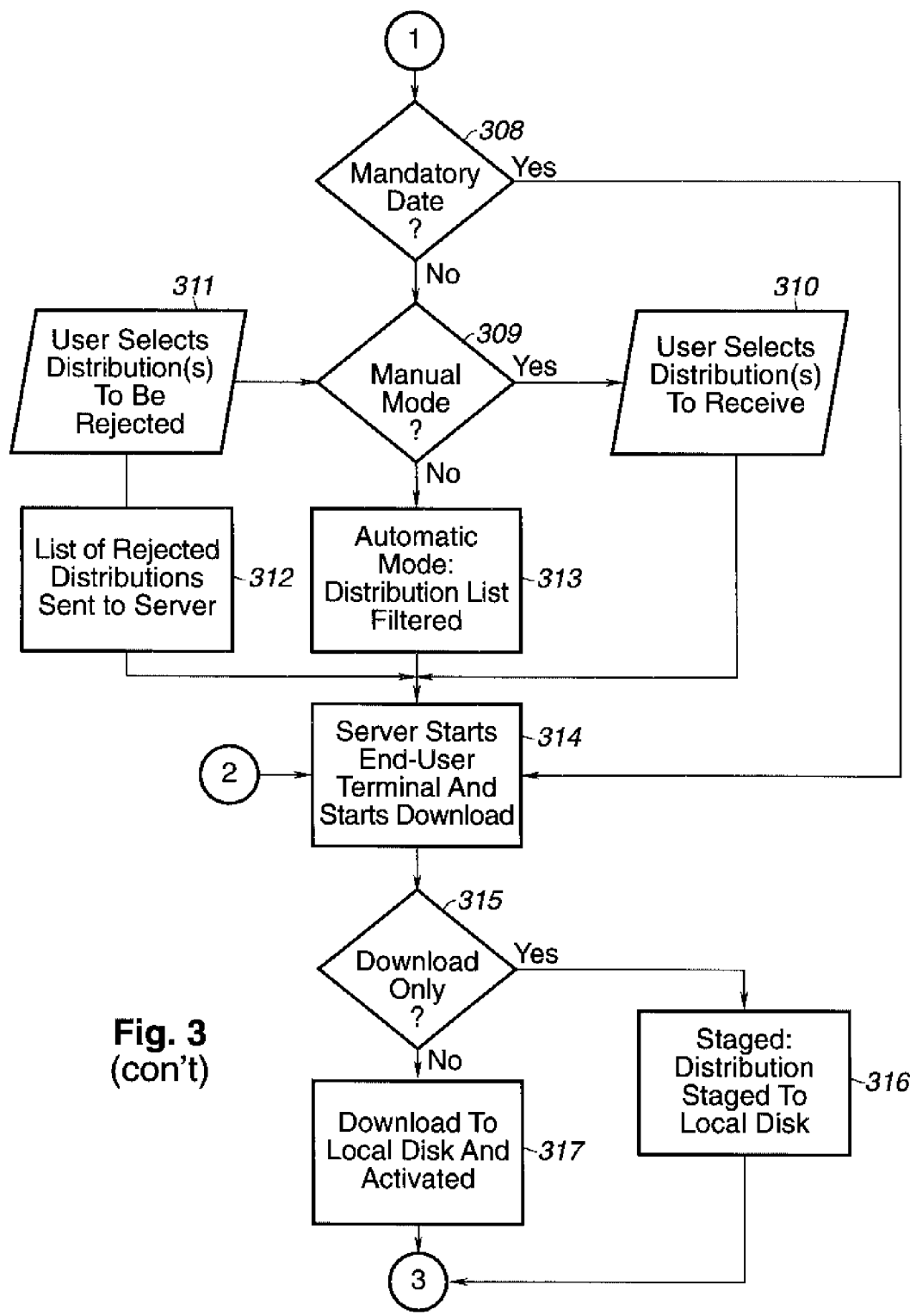
Fig. 3 (con't)

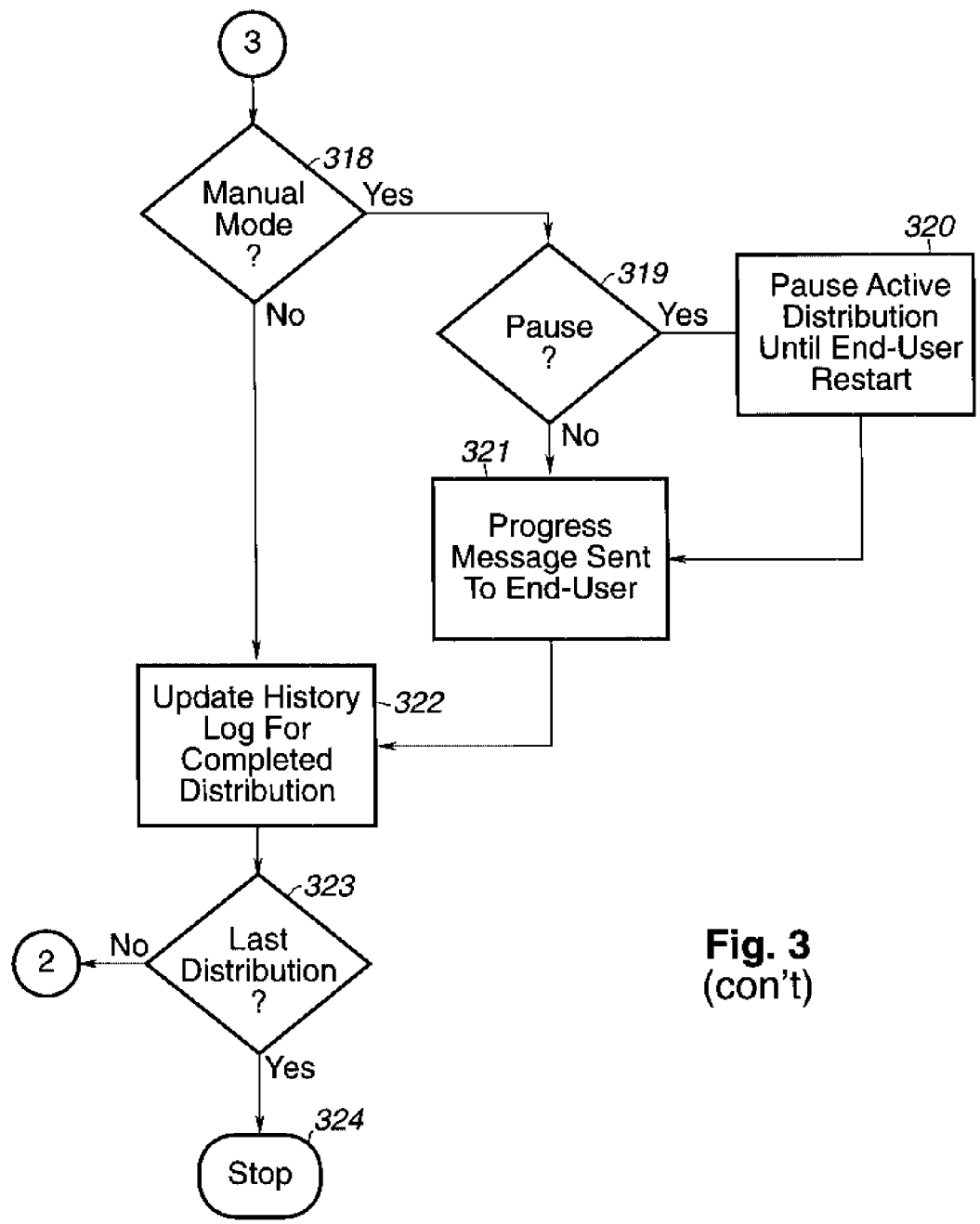
Fig. 3 (con't)

METHODS OF SELECTIVELY DISTRIBUTING DATA IN A COMPUTER NETWORK AND SYSTEMS USING THE SAME

CROSS-REFERENCE TO RELATED APPLICATIONS

Related subject matter may be found in the following commonly assigned, co-pending U.S. Patent Applications which are hereby incorporated by reference herein:

Ser. No. 09/438,437, entitled "A SERVICE FOR DISTRIBUTING AND COLLECTING BULK DATA BETWEEN DATA PROCESSING SYSTEMS" and filed Nov. 12, 1999.

Ser. No. 09/460,855, entitled "APPARATUS FOR DATA DEPOTING AND METHOD THEREFOR" and filed Dec. 14, 1999;

Ser. No. 09/460,853, entitled "APPARATUS FOR RELIABLY RESTARTING INTERRUPTED DATA TRANSFER AT LAST SUCCESSFUL TRANSFER POINT AND METHOD THEREFOR" and filed Dec. 14, 1999;

Ser. No. 09/458,269, entitled "SYSTEMS AND METHODS FOR REAL TIME PROGRESS MONITORING IN A COMPUTER NETWORK" and filed concurrently herewith; and Ser. No. 09/392,836 entitled "SYSTEM FOR MONITORING USE OF I/O ADAPTERS WITH DIFFERENT VOLTAGE LEVELS" and filed concurrently herewith.

TECHNICAL FIELD

The present invention relates generally to the computer networks, and in particular to methods of distributing data in a computer network and systems using the same.

BACKGROUND INFORMATION

Network distribution of software products has become one of the most important means by which a software vendor can efficiently and conveniently support its customers. These typically embody a centrally administered management model where an administration pushes software to many, perhaps thousands, of end users. Notwithstanding the efficiency resulting from network distribution, these procedures take time, which often results in frustration and impatience on the part of the receiving customers. For example, a distribution of a large software package (i.e., greater than 100 megabytes) to a large number of end user machines (i.e., greater than a 1000) can take many hours if not days. During this time, the end users are often left wondering about the status of the download. In addition, a distribution can encounter a variety of errors and similar anomalies, including unavailable target machines on the network, failed installation on various end user machines, and network outages. In these cases, both the distributing entity and the end users have a vested interest in monitoring the distribution progress.

Moreover, the end user may wish to have control over the decision to receive and install software. For example, a software vendor may provide a new product or an upgrade to an existing product which the end-user may wish to refuse due to the cost or lack of need for the product. In other words, the end-user may wish to receive an indication of what software is available by distribution and then have the choice to accept or reject a given product.

Currently available software distribution methods provide little, if any, feedback to the end users with regards to the progress and status of the download process. Often the end users are presented with a simple hourglass icon on their computer screens which indicates that the process has been initiated, but provides little information as to when the distribution might finish or if any errors have been encountered. Additionally, existing software distribution methods do not provide an efficient, user-friendly means by which a given end-user can selectively accept or reject software products available for distribution over a network.

In sum, the need has arisen for systems and methods which allow the end-users to interact with the distribution and thereby selectively accept or reject distributions submitted by the administrator, as well as to monitor the progress to get a reasonable idea of when the distribution might finish. Moreover, provision would preferably be made to allow closer control by the end-user of the distribution process to the end-user's computer including but not limited to the ability to pause, resume or abort an active distribution.

SUMMARY OF THE INVENTION

The principles of the present invention are embodied in methods of distributing data in computer systems, and in particular computer networks, as well as the computer systems themselves. According to one embodiment, a method is provided for distributing data in a system including an end-user computer and a server. A distribution list is transmitted from the server to the end-user computer from which the end-user then selects data distribution from the distribution list. The selected data distribution is then downloaded from the server to the end-user computer.

According to another embodiment, a method is disclosed for distributing data in a network including a server and an end-user computer. The end-user computer queries the server for a distribution list. The end-user computer thereafter receives the distribution list from the server and determines if the distribution list is non-empty. A distribution is then selected from the distribution list if the distribution is non-empty, using a selected one of manual and automatic modes. The selected distribution is then downloaded from the server to the end-user computer.

A computer network is disclosed which embodies the principles of the present invention. The computer network includes a server and an end user computer. The server is coupled to the network and is associated with memory storing a selected number of data distributions and is operable to generate a list identifying the data distributions and selectively download such data distributions through the network. The end-user computer is also coupled to the network and is operable to query the server for the distribution list. The distribution list is received by the server. If the distribution list is non-empty, the end-user computer selects the distribution from the distribution list for download from the server. The end-user then receives and stores the selected data distribution in local storage.

The principles of the present invention provide substantial advantages over the prior art. Among other things, an end-user can conveniently update, patch, or add to the software locally resident on the end-user computer. The end-user has the option of selecting such data distributions for receipt either automatically or manually. In each case, specific distributions can be accepted or rejected. Moreover, in the case of critical distributions, data can be transferred to the end-user computer automatically and without the acceptance/rejection procedure. Finally, provisions are made allowing the end-user to monitor the progress of the distribution action, as well as to initiate control actions such as pause and resume.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
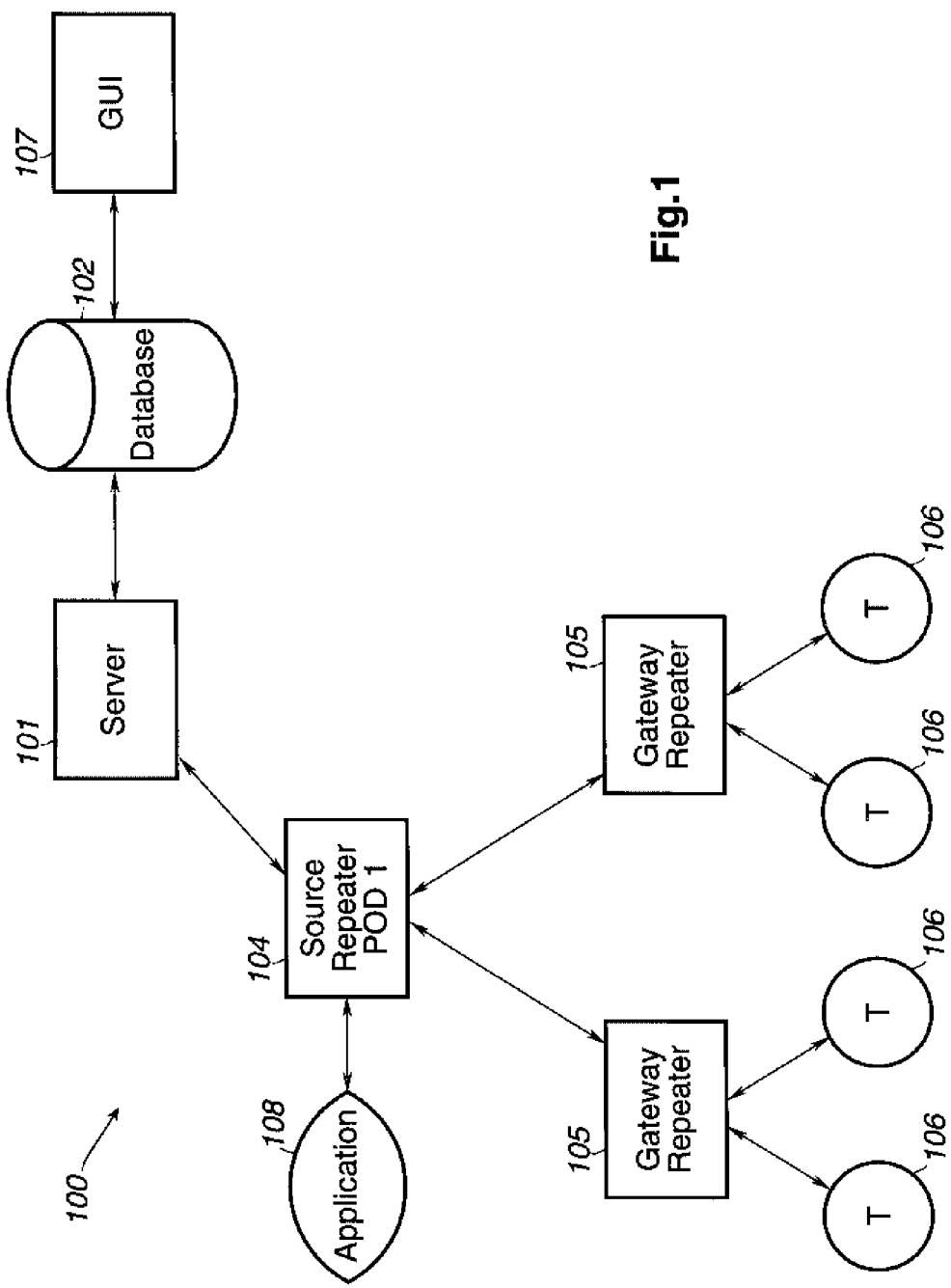
FIG. 1 is a high level diagram of an exemplary computer networking system suitable for practicing the principles of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Referring to the drawings, depicted elements are not necessarily shown to scale, and like or similar elements are designated by the same reference numeral through the several views.

FIG. 1 is a high level functional block diagram of a computer network 100 suitable for practicing the principles of the present invention. It should be noted that network 100 is for illustrative purposes and that in actual applications of the principles of the present invention, network 100 may include a larger or even much larger number of network nodes and corresponding cross-connections.

Network 100 is based upon a server 101 operating in conjunction with a database 102. For purposes of the present discussion, server 101 maintains the distribution manager software system ("distribution manager") which provides overall control for the bulk transfer of data throughout network 100.

A source repeater 104 maintains communications between server 101 and the lower level repeaters in the repeater hierarchy of the system. Note that source repeater 104 may be a logical component of server 101 and may, but need not be, in an embodiment of the present invention, a physical stand-alone hardware device in network 100. The "lowest" level of repeaters in this example are the gateway repeaters 105 which are repeaters that are connected to end-user computers, or targets (T), 106. It should be noted that in the actual applications there may be one or more additional hierarchical repeater levels between source repeaters 104 and gateway repeaters 105, such additional repeater layers not being shown here for brevity and clarity.

Each gateway repeater 105 communicates with corresponding number of end-user computers 106, a selected number of which are shown in FIG. 1 for reference. Computers 106, which may be for example, work stations or personal computers in the home or office, may also be referred to as clients or endpoints, for simplicity.

A graphics user interface (GUI) 107 is provided, as discussed further below, to allow the system user or administrator monitoring of data distributions across the network. Graphics user interface 107 is effectuated, for example, by a workstation or PC similar to that illustrated in FIG. 2. Moreover, at least one of the source repeaters operates in association with an application program (software) (shown generally at 108) which initiates a data distribution and receives results returned from endpoints 106. Data distributions can also be initiated by graphical users interfaces and/or applications programs running at any of the endpoints 106.

Figure 2:
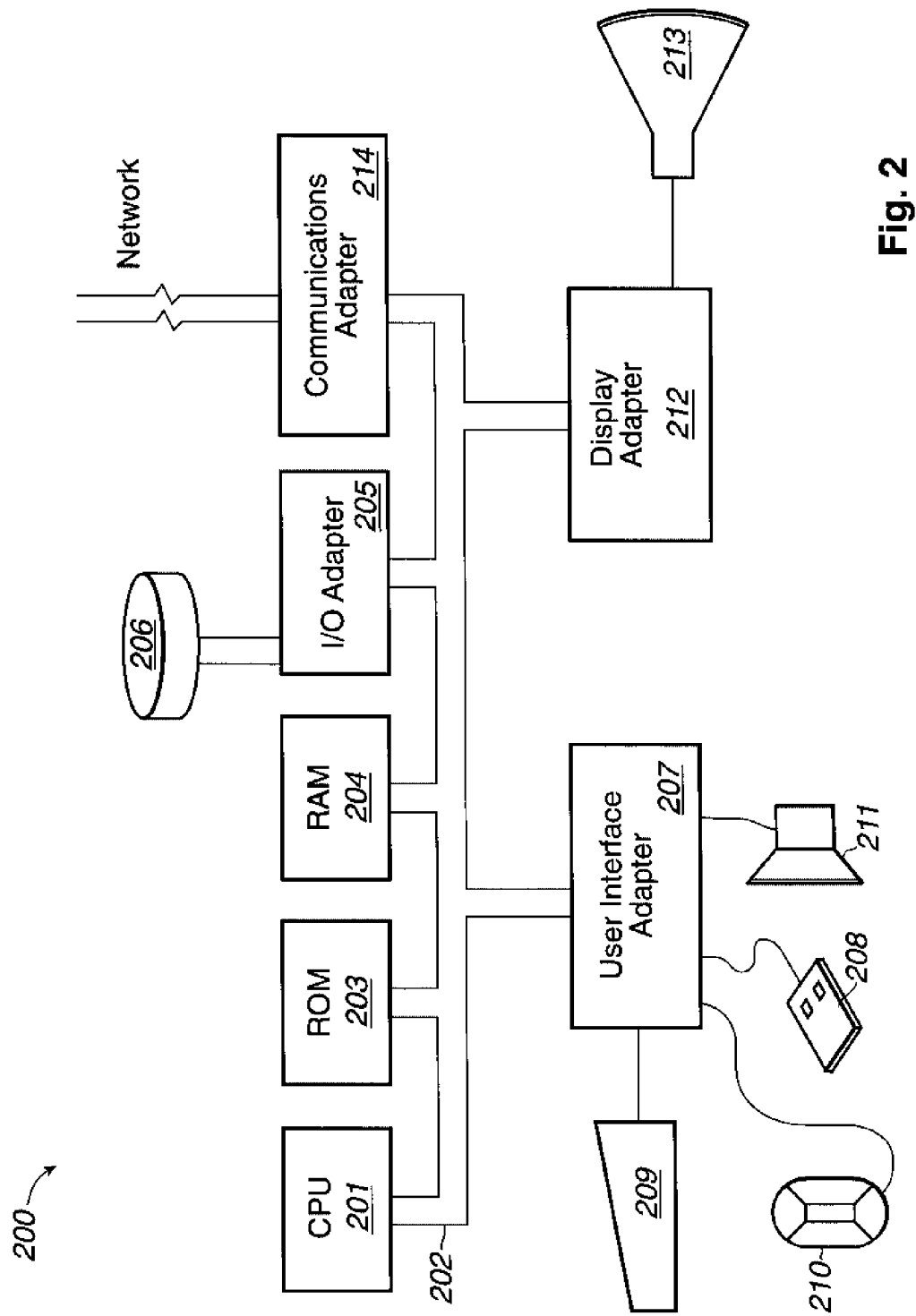
FIG. 2 is a more detailed functional block diagram of a processing system suitable for use in one or more of the processing nodes of the system in FIG. 1.

FIG. 2 is a high level functional block diagram of a representative data processing system 200 suitable for practicing the principles of the present invention. System 200 is an example of endpoint 106, and also may be used to implement server 101 and various repeaters throughout system 100. Processing system 200, includes a central processing system (CPU) 201 operating in conjunction with a system bus 202. CPU 201 may be for example, a reduced instruction set computer (RISC), such as an IBM POWER Processor, or a complex instruction set computer (CISC). System bus 202 operates in accordance with a standard bus protocol, such as the ISA protocol, compatible with CPU 201.

CPU 201 operates in conjunction read-only memory (ROM) 203 and random access memory (RAM) 204. Among other things, ROM 16 supports the basic input output system (BIOS). RAM 204 includes for example, DRAM (Dynamic Random Access Memory) system memory and SRAM (Static Random Access Memory) external cache.

I/O Adapter 205 allows for an interconnection between the devices on system bus 202 and external peripherals, such as mass storage devices (e.g., a hard drive, floppy drive or CD/ROM drive), or a printer. A peripheral device 206 is for example, coupled to a peripheral control interface (PCI) bus, and I/O adapter 205 therefore may be, for example, a PCI bus bridge.

User interface adapter 207 couples various user input devices, such as keyboard 208, mouse 209, touchpad 210 or speaker 211 to the processing devices on bus 202.

Display adapter 212 supports a display 213 which may be for example a cathode ray tube (CRT), liquid crystal display (LCD) or similar conventional display unit. Display adapter 212 may include among other things a conventional display controller and frame buffer memory.

System 200 can be selectively coupled to a computer or telecommunications network through communications adapter 214. Communications adapter 214 may include for example, a modem for connection to a telecommunications network and/or hardware and software for connecting to a computer network such as a local area network (LAN) or wide area network (WAN).

Figure 3:
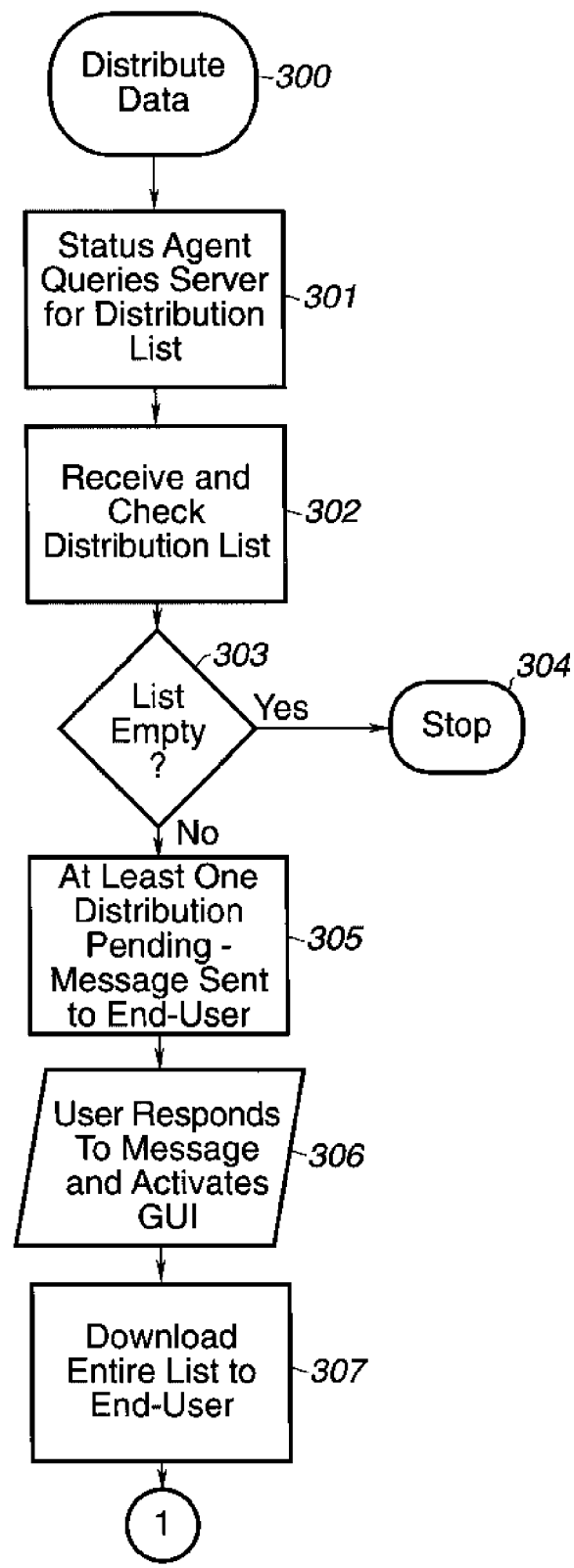
FIG. 3 is a flow diagram illustrating a data distribution procedure in accordance with the principles of the present invention.

FIG. 3 is a flow diagram illustrating a data distribution procedure 300 in accordance with the principles of the present invention. Distribution procedure 300 may be used for example for distributing bulk data for distributed processing on a network such as a network 100 or for the electronic distribution of applications software to subscribing end-users 106. Procedure 300 starts at Step 301 following computer boot up wherein a software status agent on a given end-user computer 106 queries the server 101 for a distribution list. The distribution list describes potential data distributions from the server to the given target machine 106. The distribution list can be empty, contain mandatory distributions from the server to the target end-user machine, or end-user selectable distributions.

At Step 302, the target end-user machine 106 receives the distribution list and checks its contents. If at Step 303 it is found that the list is empty, then the procedure stops at Step 304. Otherwise, the server sends a message to the end-user indicating that at least one potential data distribution is pending at Step 305. The message could be, for example, in the form of an icon or other graphical representation provided on the screen of the end-user machine. Thereafter, the end-user can activate the corresponding graphics user interface for controlling the distribution or distributions at Step 305. For example, if an icon was presented to the end-user at Step 305, then the end-user could activate the graphic user interface simply by clicking on that icon.

Figure 4:
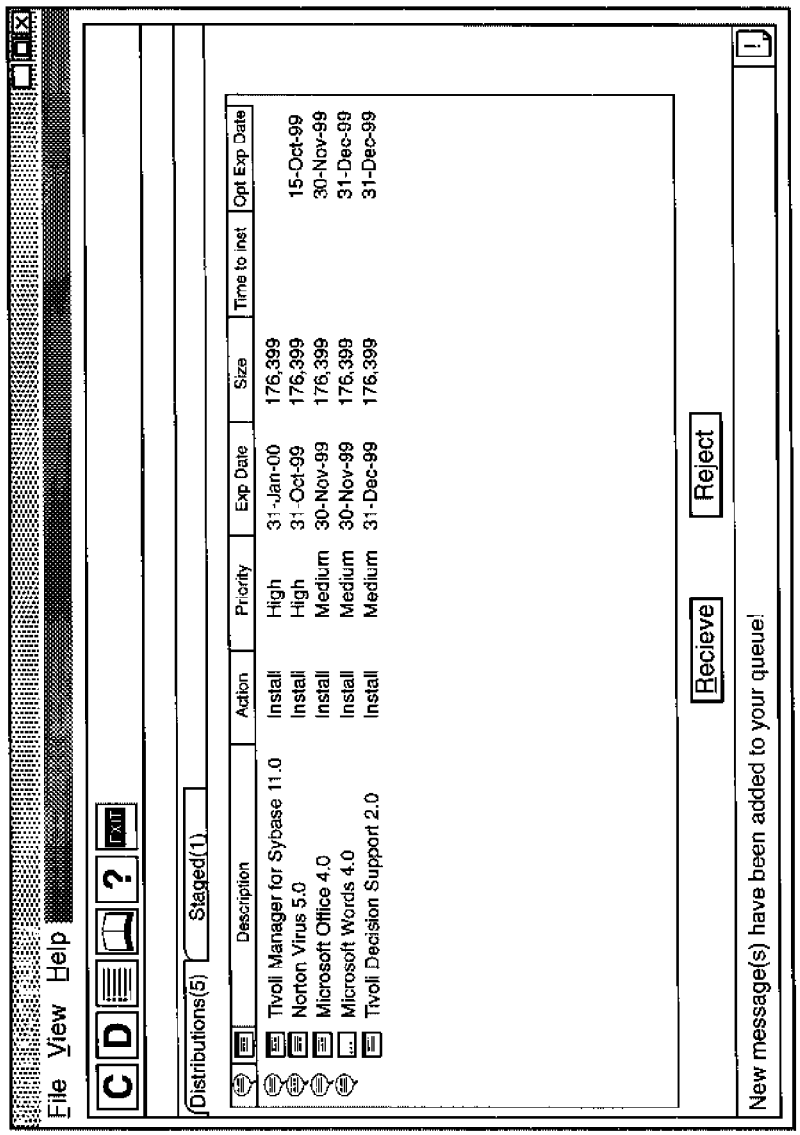
FIG. 4 is an example of a graphical user interface (GUI) which could be used to inform the end-user of the available distributions queued on server.

The entire distribution list is downloaded to the end-user at Step 307 and display is generated. FIG. 4 is an example of a graphical user interface (GUI) which could be used to inform the end-user of the available distributions queued on server 101. In this case, a general description is provided for each entry, along with an indication of the size of the distribution, the possible action to be taken with regards to the distribution, the priority as well as mandating and/or optimal expiration dates for the distribution. In alternate embodiments, the scope and content of this GUI may change as required by the application.

As already noted, given distribution may be associated with a mandatory expiration date. In this case, the distribution is made to the corresponding end-user computer 106 at Step 308 without end-user input. Otherwise, the procedure continues at Step 309, depending on whether the end-user computer is in the manual or automatic mode. In the manual mode, the user can select one or more distributions to be received (Step 310) or one or more distributions to be rejected (Step 311). This can be accomplished by clicking-on the receive and/or reject display buttons shown in FIG. 4 with a mouse. In the event that at least one distribution is rejected, a list of the rejected distribution or distributions is sent to server 101 such that the server can correspondingly remove the items in the list in its distribution queue (Step 312). In the automatic mode, the distribution list is filtered in software at Step 313. Specifically, the end-user has set up a list of distributions it wishes to receive, and the software filter selects only those distributions for downloading.

Figure 5:
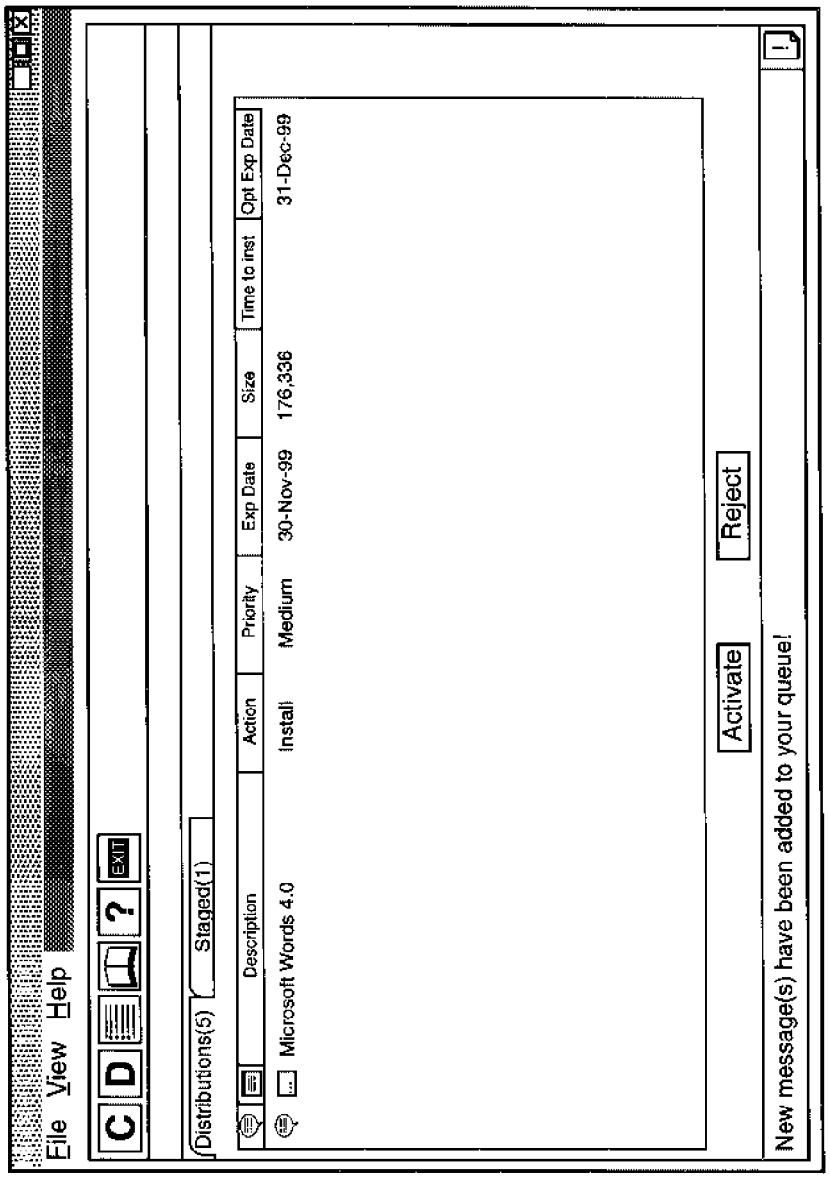
FIG. 5 is an illustration of activation being done later at the convenience of the end-user, by clicking-on the "activate" button on the GUI display screen shown in FIG. 5.

At Step 314, the server starts the end-user computer and the first download selected at Steps 309 and 313. Each download can be performed in one of two ways at Step 315. First, the distribution download can be staged at Step 316. Here, the data is simply downloaded to local storage (disk) at the end-user computer but is not activated. Activation can then be done later at the convenience of the end-user, for example by clicking-on the "activate" button on the GUI display screen shown in FIG. 5. Under the second option, at Step 317, the distribution is downloaded to local storage and immediately activated.

If the download is being performed in the manual mode at Step 318, then the end-user has the opportunity at Step 319 to pause the download. If a pause is selected, the then active distribution is paused at Step 320 until the end-user manually initiates a re-start. Additionally, in the manual mode, the end-user is able to receive progress messages at Step 321 tracking the progress of the active distribution.

Figure 6:
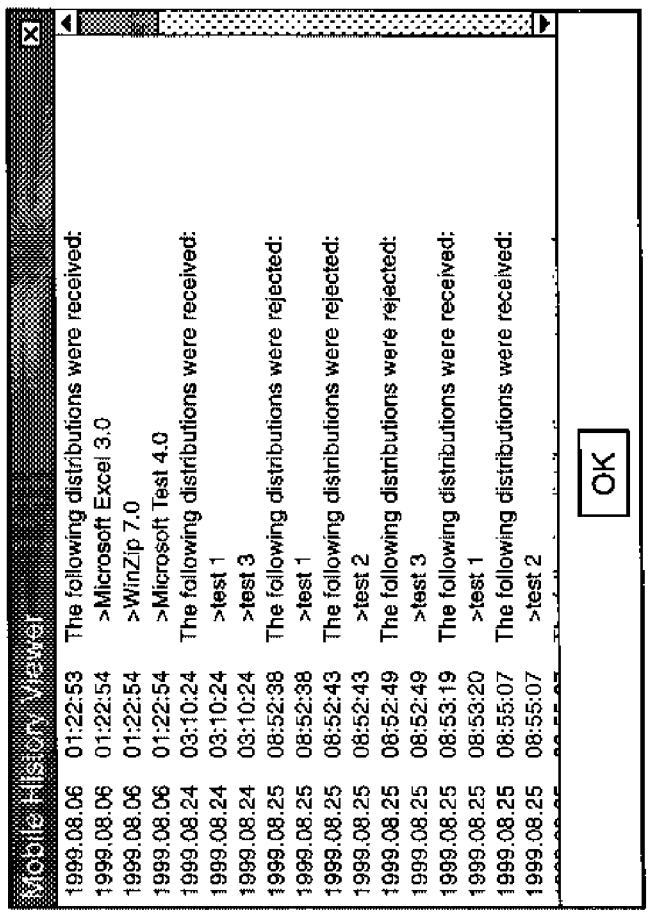
FIG. 6 depicts an exemplary GUI suitable for presenting the history log to a user at the server or to the end-user at the end-user's computer.

For each completed distribution, a history log is updated and archived at the end-user computer 106 and/or server 101. FIG. 6 depicts and exemplary GUI suitable for presenting the history log to a user at the server or to the end-user at the end-user's computer. If the just completed distribution is the last selected distribution at Step 323, then, at Step 324, the status indicator on the endpoint is set to "No Pending" and at Step 325 distribution procedure 300 has finished. Otherwise, the procedure returns to Step 314 and the next selected distribution is performed.

Although the present invention and its advantages have been described in detail, it should be understood that various changes, substitutions and alterations can be made herein without departing from the spirit and scope of the invention as defined by the appended claims.

What is claimed is:

1. A method of distributing data in a network including a server and an end-user computer comprising the steps of:
   querying the server from the end-user computer for a distribution list;
   receiving the distribution list from the server at the end-user computer;
   determining if the distribution list from the server is non-empty;
   selecting a distribution from the distribution list if the distribution list is non-empty using a selected one of manual and automatic modes; and
   downloading the distribution from the server to the end-user computer.

2. The method of claim 1 and further comprising the step of generating an indicator at the end-user computer in response to said step of determining that the distribution is non-empty.

3. The method of claim 1 wherein in the manual mode said step of selecting comprises the step of selecting the distribution using a graphical user interface at the end-user computer, the GUI for displaying distribution properties to an end-user.

4. The method of claim 1 and further comprising the step of pausing said step of downloading in response to input at the end-user computer in the manual mode.

5. The method of claim 1 and further comprising the steps of:
   selectively rejecting a distribution on the distribution list at the end-user computer in the manual mode; and
   transmitting a message to the server identifying the distribution rejected.

6. The method of claim 1 and further comprising the step of activating the selected distribution substantially concurrently with said step of downloading.

7. The method of claim 1 wherein the step of selecting comprises the step of automatically selecting the data distribution from the distribution list using a software filter comprising one or more end-user preselected criteria.

8. The method of claim 1 further comprising activating said stored selected data distribution in response to end-user input via a graphical user interface (GUI) for displaying distribution properties to an end-user.

9. A computer network comprising:
a server coupled to said network and associated with memory storing a selected number of data distributions and operable to generate a list identifying said data distributions and selectively download said data distributions through said network; and
an end-user computer coupled to said network and operable to:
query said server for said distribution list;
receive the distribution list from the server;
determine if the distribution list from the server is non-empty;
select a distribution from the distribution list if the distribution list is non-empty for download from said server; and
receive and store the selected data distribution in local storage.

10. The computer network of claim 9 wherein said end-user computer is operable to select said distribution in response to end-user input.

11. The computer network of claim 10 wherein said end-user input is made through a graphical user interface (GUI) presented by said end-user computer, the GUI for displaying distribution properties to an end-user.

12. The computer network of claim 9 wherein said end-user computer is coupled to said server through at least one repeater within said network.

13. The computer network of claim 9 wherein said end-user computer is operable to activate said stored selected data distribution in response to end-user input.

14. The computer network of claim 13 wherein said stored selected data distribution is activated in response to user input via a graphical user interface (GUI) for displaying distribution properties to an end-user.

15. The computer network of claim 9 wherein the end-user computer operable to select the distribution from the distribution list is operable for selecting the distribution in a selected one of a manual mode and an automatic mode.

16. The computer network of claim 15 wherein in the automatic mode, the distribution is selected from the distribution list using a software filter comprising one or more end-user preselected criteria.

17. A computer program product embodied in a tangible storage medium, the program product comprising a program of instructions for performing:
querying the server from the end-user computer for a distribution list;
receiving the distribution list from the server at the end-user computer;
determining if the distribution list from the server is non-empty;
selecting a distribution from the distribution list if the distribution list is non-empty using a selected one of manual and automatic modes; and
downloading the distribution from the server to the end-user computer.

18. The program product of claim 17 and further comprising program instructions for generating an indicator at the end-user computer in response to said step of determining that the distribution is non-empty.

19. The program product of claim 17 wherein, in the manual mode, the step of selecting comprises selecting the distribution using a graphical user interface (GUI) at the end-user computer, the GUI for displaying distribution properties to an end-user.

20. The program product of claim 17 and further comprising, in the manual mode, program instructions for pausing the step of downloading in response to input at the end-user computer.

21. The program product of claim 17 and further comprising program instructions for:
selectively rejecting a distribution on the distribution list at the end-user computer; and
transmitting a message to the server identifying the distribution rejected.

* * * * *